US006412339B1

(12) United States Patent
Care

(10) Patent No.: US 6,412,339 B1
(45) Date of Patent: *Jul. 2, 2002

(54) MONITORING OF BEARING PERFORMANCE

(75) Inventor: Ian CD Care, Derby (GB)

(73) Assignee: Rolls-Royce plc, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/553,404

(22) Filed: Apr. 20, 2000

(30) Foreign Application Priority Data

May 25, 1999 (GB) .............................. 9912112

(51) Int. Cl.⁷ ................................. G01N 7/27
(52) U.S. Cl. .......................................... 73/86
(58) Field of Search ..................... 73/7, 86, 118.1, 73/865.9; 384/8, 448; 340/682

(56) References Cited

U.S. PATENT DOCUMENTS

| 5,233,499 A | | 8/1993 | Twerdochlib |
| 5,244,287 A | * | 9/1993 | Yoshikawa ................. 384/448 |
| 5,703,295 A | * | 12/1997 | Ishida et al. |

FOREIGN PATENT DOCUMENTS

DE 19546084 C1 P 5/1997

* cited by examiner

*Primary Examiner*—Robert Raevis
(74) *Attorney, Agent, or Firm*—W. Warren Taltavull; Manelli Denison & Selter PLLC

(57) ABSTRACT

A method and apparatus for anticipating the onset of or measurement of a deleterious condition in a bearing comprising monitoring the bearing for electrostatic activity indicative of the onset of the condition using one or more electrostatic sensors, processing signals derived from the sensors and employing same to activate alarm means, alter bearing loading to reduce or eliminate the source condition or shut down the equipment to prevent further bearing damage.

25 Claims, 1 Drawing Sheet

MONITORING OF BEARING PERFORMANCE

FIELD OF THE INVENTION

The present invention relates to a method and means for monitoring the performance of mechanical bearings.

BACKGROUND OF THE INVENTION

Mechanical bearings, such as ball or roller bearings, are designed to operate under predetermined load conditions. When correctly loaded bearings work well. However at loads approaching zero, slippage can occur between components of the bearing. With changing loads the bearing races can move out of their correct optimum positions. Vibration and impact can also damage bearing components. Hitherto it has been difficult to sense the onset of slippage or other conditions giving rise to bearing damage with the result that bearings are generally over-engineered relative to the loading and other conditions under which they are designed to operate.

When a mechanical rolling element bearing operates correctly the surface rotation speed of the rolling elements of the bearing are the same as the differential speed between the inner and outer races. The bearing elements will appear to rotate at around half the differential speed of the inner and outer components of the bearing. If a bearing slips, overheating and damage can result. The surface speed of the rolling elements will reduce and the speed of the cage in which they are mounted will be less than the differential speed of the inner and outer races. Detection of these conditions therefore provides early warning of potential bearing failure.

Hitherto sensing of slippage or other stress conditions in such bearings has been relatively complex. Previous proposals include the use of thermal sensors to detect overheating of the lubricant film in which the bearing operates or have required incorporation of radioactive tracers in the bearing components themselves. Such systems are complex. In addition they operate by detecting slippage and cannot detect overstressing of bearings through other causes. Previous proposals have also included proximity sensors operative to detect the speed of rotation of bearing rolling elements and races.

SUMMARY OF THE INVENTION

It is an object of the present invention to provide an improved method and apparatus for monitoring bearing performance.

We have found that bearings subject to stress or slippage generate a significant electrostatic charge, proportional to the degree of stress and a change of charge distribution under slippage. Thus it is possible to sense the condition of a bearing by sensing the resultant change and pattern of electrostatic activity. Accordingly the invention provides a method of anticipating the onset of a deleterious condition in a bearing comprising monitoring the bearing for electrostatic activity indicative of the onset of distress of the bearing or its components.

Preferably the method includes generation of an output signal responsive to detection of said change in electrostatic activity. Said output signal may be employed to actuate indicator or alarm means providing a visual and/or audible warning of the onset of the said condition. Alternatively or in addition said signal may be employed to rectify a condition giving rise to stressing or slippage of the bearing. Thus the output signal may be employed to alter the bearing loading to remove the source of the deleterious condition. Alternatively said output signal may be employed to terminate operation of equipment of which the bearing forms a part to prevent further bearing damage, or to limit the 'life' or further running of the bearing to prevent failure.

The invention also provides apparatus for anticipating the onset of a deleterious condition in a bearing comprising means for sensing electrostatic activity in the bearing generated in response to the onset of distress of the bearing or its components.

Preferably said means for measuring electrostatic activity comprises an electrostatic sensor adapted to be mounted within sensing proximity range outside the bearing or within the bearing structure and operable to detect changes in electrostatic charge on components of the bearing.

Preferably also the apparatus includes means for generating a signal in response to said changes in activity and means for processing said signal to produce an electrical output.

The apparatus may also optionally include means for detecting individual bearing elements and for processing of signal(s) derived therefrom.

The apparatus may include visual or audible alarm means operable in response to said output to provide a warning of the onset of said deleterious condition. Alternatively or in addition the apparatus may include means operable in response to said output to alter the loading on the bearing to reduce or eliminate said condition. The apparatus may alternatively include means operable in response to said output to interrupt operation of equipment of which said bearing forms a part to prevent further damage to the bearing.

The output signal may be recorded or stored to show events in the bearing life/performance as part of an engine/shaft/bearing health management system. In this way a continuous record of bearing performance over time may be produced and may be employed to predict remaining or used bearing life.

BRIEF DESCRIPTION OF THE DRAWINGS

An embodiment of the invention will now be described, by way of example only, with reference to the accompanying drawings, in which.

DETAILED DESCRIPTION OF THE INVENTION

Figure 1:
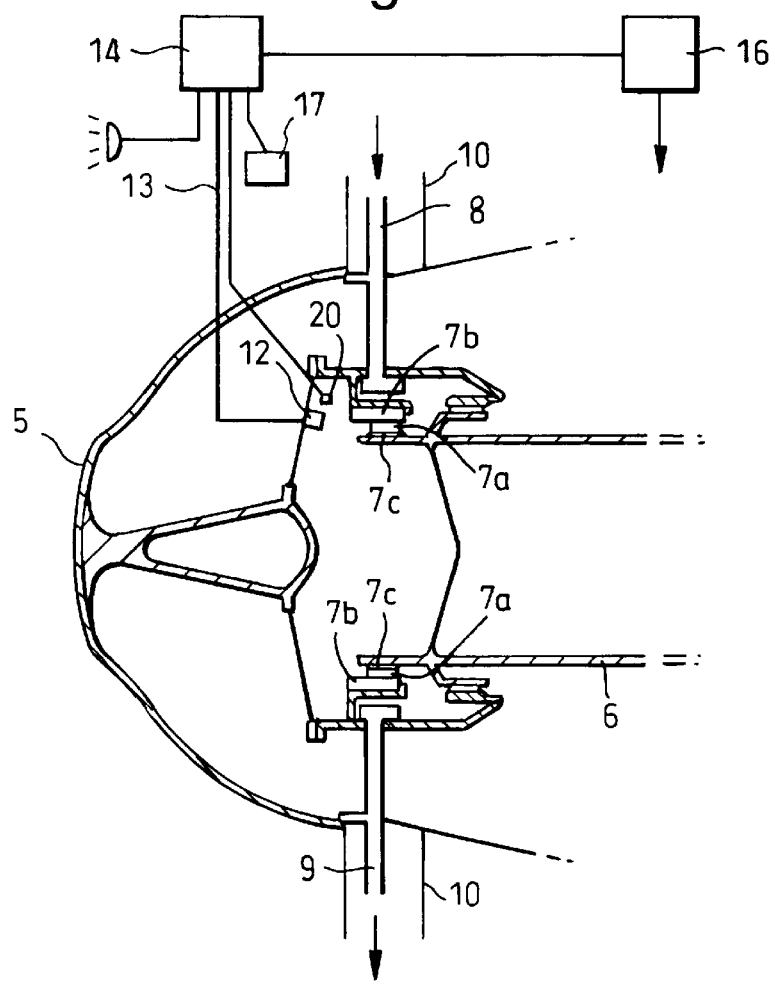
FIG. 1 is a diagrammatic cross-section through part of a gas turbine engine incorporating means for monitoring bearing performance according to the invention.

Referring to FIG. 1, there is shown the rear bearing compartment of a gas turbine aircraft engine incorporating a compartment housing cap 5 within which a hollow compressor shaft 6 is supported at its rear end in a mechanical rolling element bearing 7 mounted in the cap structure 5. The bearing 7 comprises a plurality of rolling elements 7a in the form of balls or rollers retained between inner and outer races 7b and 7c. Lubricating oil is supplied to the bearing through oil inlet and outlet pipes 8 and 9 housed within fixed support members 10 by means of which the cap structure 5 is mounted within a surrounding plug assembly (not shown).

The components of the bearing may be metallic, non-metallic or a combination of metallic and non-metallic components.

An electrostatic sensor 12 is mounted in a fixed position adjacent the bearing 7 and is connected in an electrical circuit 13 with a processor 14 operable to generate a signal in response to changes in electrostatic charge sensed by the sensor 12. Any suitable form of electrostatic sensor may be employed, for example, sensors of the type disclosed in International Patent Specification No. WO92/02886 or U.K. Patent Specification No. 2302593.

Under static conditions the sensor measures ball or roller distress which bears a relationship to contact load. If the bearing 7 is subjected to overload or slippage resulting in changes of relative speed and /or direction of movement of the rolling elements of the bearing in relation to the bearing races in which they run, a measurable change of electrostatic charge is generated in the components of the bearing and sensed by the sensor 12. This change in electrostatic charge arises as stress or slippage conditions are approached and the sensor 12 thus generates a signal indicative of the onset of such a condition. The signal is transmitted to the processor 14 which generates an output which may be used to perform any of a number of functions.

Figure 2A:
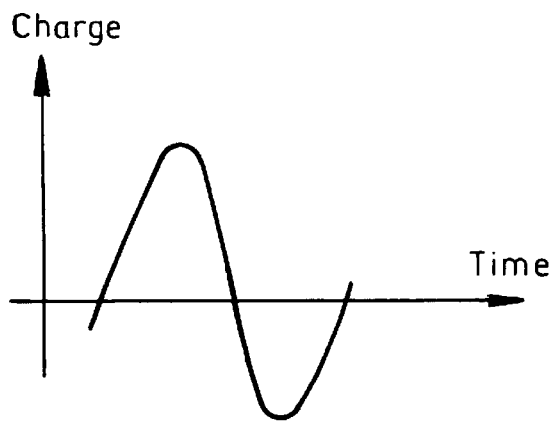
FIG. 2a is a diagram of the signal produced by a bearing under normal operating conditions.
Figure 2B:
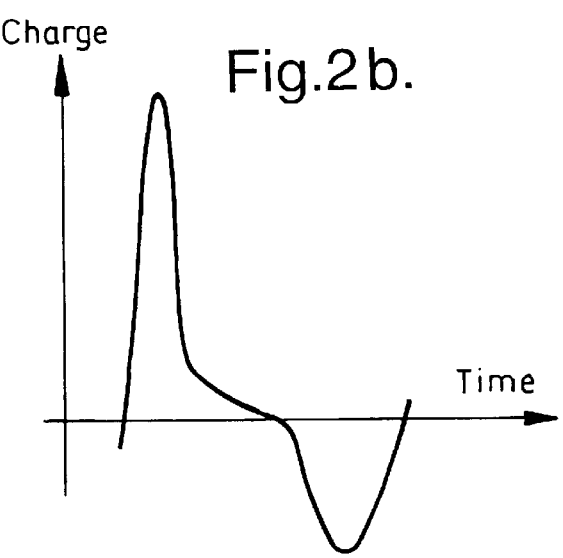
FIG. 2b is a similar diagram showing the signal produced from a bearing undergoing or about to undergo slip.

FIGS. 2a, 2b are illustrative of the signal produced from a bearing under normal and stressed conditions respectively. The signal generated under normal operation is of generally sinusoidal form. Under stress a narrow and increased positive peak is generated as shown in FIG. 2b, the amplitude of which is proportional to the degree of stress in the bearing. During initial setting up, the sensor may be adjusted to measure the electrostatic charge under static conditions (and hence the initial level of ball or roller distress) on to which the variable change is then superimposed. Alternatively the sensor may be adjusted to zero reading under static conditions so as to measure only the variable electrostatic charge generated under operating conditions.

In one arrangement the output from the processor 14 may be employed to energize an audible or visual warning device 15 to warn of the onset of the adverse condition in the bearing. Alternatively, or in addition the processor 14 may be connected to a control unit 16 operable to alter the source of the stress or slippage as disclosed for example in co-pending United Kingdom Application No. 9912108.9. In such cases restoration of satisfactory loading conditions will restore charge levels being detected by the sensor 12 and processor 14 to normal and thereby remove the corrective action once optimum operating condictions have been restored. In this way the sensor 12 forms part of a continuous monitoring and control system serving to sense the onset of slippage or overstressing of the bearing and operable to reduce or eliminate the source condition and thereby minimize wear or damage to the bearing and increase bearing life.

By virtue of the use of an electrostatic sensor positioned in close proximity to the bearing to be monitored, the method and apparatus are non-invasive and less complex than techniques proposed hitherto since, as shown in FIG. 1, the sensor 12 is free of any wire electrical connection to the bearing 7. Moreover by sensing changes in electrostatic charge generated within the bearing components as a result of the onset of a deleterious condition, the arrangement described is effective not only to sense the onset of slippage, but also other stress conditions within the bearing not hitherto detectable by previously proposed techniques. The output signal from the processor 14 may be recorded and stored in a recording device 17 to show events in the bearing life/performance as part of an engine/shaft/bearing health management system. In this way a continuous record of bearing performance over time may be produced and may be employed to predict remaining or used bearing life.

Various modifications may be made without departing from the invention. For example while the invention has been described by reference to a shaft bearing in a gas turbine engine, it may be employed in any situation where mechanical bearings are employed in order to continuously monitor bearing performance and provide early warning of stress or slippage and, where appropriate, initiate corrective action to reduce or eliminate the source of the problem. In some cases the signal generated by the sensor or processor may be employed through a control unit such as the unit 16 to shut down equipment of which the bearing forms a part in order to prevent further or accelerated damage. It will be appreciated also that in the case of gas turbine engines a similar sensing system may be employed in association with any or all of the bearings on which the various shafts incorporated in such engines are rotatably mounted.

In a further modification an additional sensor 20 may be located adjacent to the bearing to detect the presence of each rolling element as it moves past the sensor. By correlating signals from both sensors, the individual ball, roller or like bearing element giving rise to a stress or slippage signal may be identified.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of detecting the onset of a deleterious condition in a mechanical rolling element bearing comprising monitoring the bearing for electrostatic activity using sensing means and noting any change in electrostatic activity in the bearing which will indicate the onset of distress of the bearing with the sensing means being free of any wired electrical connection to the bearing.

2. The method as claimed in claim 1, including the generation of an output signal responsive to detection of said change in said electrostatic activity.

3. The method as claimed in claim 2 including the step of using the output signal to generate a visual warning of the onset of said condition.

4. The method as claimed in claim 2 wherein said output signal is employed to generate an audible warning of the onset of said condition.

5. The method as claimed in claim 2 wherein said signal is employed to rectify a condition giving rise to stressing or slippage of the bearing.

6. The method as claimed in claim 5 wherein said output signal is employed to alter the bearing loading to remove the source of the deleterious condition.

7. The method as claimed in claim 2 wherein said output signal is employed to terminate operation of equipment of which the bearing forms a part to prevent further bearing damage.

8. The method as claimed in claim 2 wherein said output signal is stored and employed to provide a continuous record of bearing performance over time.

9. The method as claimed in claim 2 wherein said output signal is superimposed on a signal generated by the electrostatic charge in the bearing under static conditions.

10. The method as claimed in claim 2 wherein said output signal represents the change in electrostatic activity generated by the distress.

11. The method as claimed in claim 2 in which each rolling element of the bearing is detected and said output signal related to the rolling element or elements giving rise to said electrostatic activity.

12. Apparatus for detecting the onset of a deleterious condition in a bearing and its components comprising means for sensing electrostatic activity in the bearing or its components generated in response to the onset of distress of the bearing or said components, said means for sensing being free of and wired electrical connection to said bearing and its components.

13. Apparatus according to claim 12 wherein said means for sensing electrocstatic activity comprises an electrostatic sensor adapted to be mounted within sensing proximity range of and external to the bearing and operable to detect changes in electrostatic charge on components of the bearing.

14. Apparatus according to claim 12 wherein said means for measuring electrostatic activity comprises an electrostatic sensor adapted to be mounted within the bearing and operable to detect changes in electrostatic charge on components of the bearing.

15. Apparatus according to claim 12 including means for generating a signal in response to said changes in activity and means for processing said signal to produce an electrical output.

16. Apparatus according to claim 15 including visual alarm means operable in response to said output to provide a warning of the onset of said deleterious condition.

17. Apparatus according to claim 15 including audible alarm means operable in response to said output to provide a warning of the onset of said deleterious condition.

18. Apparatus according to claim 15 including control means operable in response to said output to alter the loading on the bearing.

19. Apparatus according to claim 15 including control means operable in response to said output to interrupt operation of equipment of which said bearing forms a part to prevent further damage to the bearing.

20. Apparatus according to claim 15 including recording means operable to record and store said output signals to provide a continuous record of bearing performance over time.

21. Apparatus according to claim 15 wherein said signal processing means is adapted to produce an initial output signal proportional to the degree of deleterious condition in the bearing.

22. Apparatus according to claim 21 wherein the output signal derived from said electrostatic activity is superimposed on said initial output signal.

23. Apparatus according to claim 15 wherein said output signal represents the change in electrostatic activity generated by said distress.

24. A gas turbine engine incorporating apparatus for anticipating the onset of a deleterious condition in a bearing according to claim 15.

25. Apparatus for detecting the onset of a deleterious condition in a bearing and its components comprising means for sensing electrostatic activity in the bearing or its components generated in response to the onset of distress of the bearing or said components, said means for sensing being free of any wired electrical connection to said bearing and its components, including means for generating a signal in response to said changes in activity and means for processing said signal to produce an electrical output, said apparatus including further sensing means operable to detect each rolling element of the bearing as it moves past said means for sensing electrostatic activity, said rolling elements including one of roller elements and individual balls whereby the individual ball or roller element giving rise to said electrostatic activity may be identified.

\* \* \* \* \*